United States Patent
Villani

(10) Patent No.: US 10,524,089 B2
(45) Date of Patent: Dec. 31, 2019

(54) METHOD AND SYSTEM OF PAIRING A RECEIVING DEVICE TO AN EXTERNAL COMMUNICATIONS INTERFACE TO CREATE AN ENFORCEABLE DYNAMIC BOUNDARY AND GEOLOCATION SYSTEM

(71) Applicant: Justin Villani, Moorestown, NJ (US)

(72) Inventor: Justin Villani, Moorestown, NJ (US)

( * ) Notice: Subject to any disclaimer, the term of this patent is extended or adjusted under 35 U.S.C. 154(b) by 0 days.

(21) Appl. No.: 15/491,415

(22) Filed: Apr. 19, 2017

(65) Prior Publication Data

US 2018/0124565 A1 May 3, 2018

Related U.S. Application Data

(60) Provisional application No. 62/415,902, filed on Nov. 1, 2016.

(51) Int. Cl.
*H04W 4/021* (2018.01)
*G08B 21/02* (2006.01)

(52) U.S. Cl.
CPC .......... *H04W 4/022* (2013.01); *G08B 21/028* (2013.01); *G08B 21/0283* (2013.01)

(58) Field of Classification Search
CPC .................................. G08B 7/06; G08B 25/10
USPC ...................................................... 340/539.13
See application file for complete search history.

(56) References Cited

U.S. PATENT DOCUMENTS

| | | | |
|---|---|---|---|
| 6,581,546 B1 | 6/2003 | Dalland et al. | |
| 7,705,728 B2 | 4/2010 | Mock et al. | |
| 7,834,757 B2* | 11/2010 | Rodgers | B60R 25/1004 340/431 |
| 7,920,066 B2 | 4/2011 | Troxler | |
| 8,854,205 B2* | 10/2014 | Daniel | G06Q 10/08 340/2.1 |
| 8,868,254 B2* | 10/2014 | Louboutin | H04W 4/021 701/2 |
| 8,955,462 B1 | 2/2015 | Golden | |
| 9,258,982 B1 | 2/2016 | Golden | |
| 9,693,536 B1* | 7/2017 | Dana | |
| 2007/0205889 A1* | 9/2007 | Rodgers | B60R 25/1004 340/539.18 |
| 2010/0042940 A1* | 2/2010 | Monday | G06F 3/0486 715/764 |
| 2014/0274225 A1* | 9/2014 | Lacatus | H04W 24/08 455/574 |
| 2015/0141037 A1* | 5/2015 | Saha | H04W 4/021 455/456.1 |
| 2015/0141045 A1* | 5/2015 | Qiu | H04W 4/021 455/456.1 |
| 2015/0319568 A1* | 11/2015 | Haro | H04W 4/029 455/456.1 |
| 2016/0247330 A1* | 8/2016 | Rork | H04W 4/021 |
| 2016/0300081 A1* | 10/2016 | Weksler | G06F 21/84 |
| 2017/0191836 A1* | 7/2017 | Korneluk | G01C 21/20 |
| 2017/0303085 A1* | 10/2017 | Kennedy | H04W 4/023 |

* cited by examiner

*Primary Examiner* — Ojiako K Nwugo
(74) *Attorney, Agent, or Firm* — McCarter & English, LLP

(57) ABSTRACT

A method and system of pairing a receiving device to an external communications interface to create an enforceable positive dynamic boundary and geolocation system is disclosed. The method and system utilizes wireless capabilities to interface with an external cellular or satellite device to uniquely integrate mobile static and dynamic boundary enforcement with geolocation capabilities.

22 Claims, 5 Drawing Sheets

METHOD AND SYSTEM OF PAIRING A RECEIVING DEVICE TO AN EXTERNAL COMMUNICATIONS INTERFACE TO CREATE AN ENFORCEABLE DYNAMIC BOUNDARY AND GEOLOCATION SYSTEM

CROSS REFERENCE TO RELATED APPLICATIONS

This application claims the benefit of U.S. Provisional Patent Application Ser. No. 62/415,902, filed Nov. 1, 2016; the disclosures of which are incorporated herein by reference in their entireties.

BACKGROUND OF THE INVENTION

Field of the Invention

This invention relates to a method and system of creating an enforceable dynamic boundary and geolocation system by interfacing a receiving device having wireless connectivity capabilities with an external cellular or satellite device. The disclosed invention further provides a unique integrated solution, creating a mobile dynamic boundary enforcement system having geolocation capabilities in the event of a breach of a boundary. The invention provides reestablishment of positive boundary control and continuing geolocation transmissions from remote location in the event of a boundary breach.

Description of the Prior Art

In the past, society relied on physical barriers to restrict movement of people, animals and/or possessions. Physical barriers proved to be expensive, not fail safe, inappropriate to certain topographical conditions, and difficult to relocate when necessary. In an attempt to solve the issues with physical boundary systems, electronic boundary systems were developed. These early electronic systems utilized a device worn by the subject that triggered an alarm or warning signal, in the form of an electric shock, when the subject affixed to the device neared the desired boundary. While resolving some of the difficulties with controlling movement, these devices still required the installation of sentinel stations or continuous buried wire at a high cost while the boundaries remained static and not easily alterable.

Over the years, several patents have issued attempting to resolve the difficulties associated with the early electronic boundary systems. These next generation systems provide some improvements, however the issue of dynamic distant establishment and resolution of boundary failure remains. The present invention solves these issues through a unique method of utilizing cellular/satellite interfaces to remotely establish configurable boundaries and locate the position of a subject while within the established boundaries, as well as to reestablish positive boundary control and location in the event that the initial boundary is breached. In the prior art, if a boundary was exceeded the subject would either be continuously shocked, potentially causing injury, or the device failed and the subject could no longer be located.

The prior art systems of Dalland, et al, U.S. Pat. No. 6,581,546, Mock, et al, U.S. Pat. No. 7,705,728, Troxler, U.S. Pat. No. 7,920,066 and Golden, U.S. Pat. Nos. 8,955,462 and 9,258,982 represent the next generation of containment systems. Each of these systems provides the ability to contain the subject of the system. However, each system fails to encompass cellular and/or satellite communication to create a dynamic boundary with a tracking and alert system capable of remote containment reestablishment. The present invention's novel incorporation of cellular and/or satellite communication provides a significant improvement over the next generation boundary systems detailed above, by providing remote enforceable dynamic boundary and geolocation at a distance only limited by the availability of cellular and/or satellite signals.

One significant difference between the present invention and the prior art is the use of a cellular and/or satellite interface to transmit position of the controlled subject when the subject is remotely located from a receiving device. The basic underlying concept of the prior art is to maintain boundary protection through the use of alarms to alert and contain. The present invention greatly improves the prior art devices and methods through the use of a receiving device having smart capabilities such as a tablet, smartphone, computer or a similar device having Wi-Fi, Bluetooth, satellite and/or similar capabilities. The novel use of a cellular network and/or Inmarsat or similar satellite systems a communications medium to geolocate a controlled subject is a completely novel invention not set forth in the prior art.

The use of a receiving device having smart capabilities provides for distant remote movement management of one or more controlled subjects. The novel use of the receiving device allows for the digital separation of any number of controlled subjects, providing a method of controlling each individual subject separately, or together as a group. The benefits of remote or group control and geolocation include decreased resource requirements and loss prevention.

The present invention provides a complete integrated solution that resolves the prior art issues of remote distant operational control of a subject through continued geolocation capability, and remotely activated forced dynamic boundary protection. Benefits of this novel invention are easily seen in caring for pets and farm. Additional benefits are seen for children, the elderly or others with conditions that require substantial supervision as well as detained individuals. Further, benefits are applied to asset and inventory control. The ability to locate and control the movements of a subject provides numerous benefits which include, but are not limited to, safe, positive control and oversight of pets, herds and impaired or restricted individuals from a remote location. Additionally, the benefits of continuous location and boundary enforcement of assets particularly those of high value are provided.

SUMMARY OF THE INVENTION

In general terms, the invention disclosed is a system and method of remote subject control and geolocation. This invention creates an enforceable dynamic boundary and geolocation system by interfacing a receiving device having wireless connectivity capabilities with an external cellular or satellite receiving device. The disclosed invention further provides a unique integrated solution, creating a mobile dynamic boundary enforcement system having geolocation capabilities in the event of a breach of a boundary providing a user controlled warning system and alarm using sound and touch warnings at increasing intervals and strengths. Further, the invention provides remote reestablishment of positive boundary control and continuing geolocation transmissions in the event of a boundary breach establishing continued controlled and location capabilities without injuring the controlled subject through continuing uncontrolled breach warnings.

It is an object of the present invention to provide a remote geolocation system for a controlled subject.

It is another object of the present invention to provide a remote enforceable dynamic boundary for use in controlling the location of a designated subject, designated subjects or a group of designated subjects.

It is yet another object of the present invention to provide a user controlled adjustable and removable boundary warning system.

It is a further object of the present invention to provide geolocation and boundary control system that is economical to scale resulting in a relatively low unit cost.

It is a feature of the present invention that the remote geolocation and boundary system is controllable through a cellular and/or satellite connection.

It is another feature of the present invention that the system reestablishes positive boundary control in the event of a boundary breach.

Other objects and features of the invention will become apparent upon review of the drawings and the detailed description.

BRIEF DESCRIPTION OF THE DRAWINGS

In the following drawings, the same parts in the various views are afforded the same reference designators.

FIG. 1 includes an expanded view of the subject protection device.

DETAIL DESCRIPTION OF THE INVENTION

In the embodiment described herein, the present invention provides for a system and method of integrating components to deploy enforced static and dynamic boundary protection and geolocation services. The unique design combines multiple capabilities into one innovative system. The streamlined design provides remote subject position location determination, static geo-boundary protection, dynamically adjustable geometric boundary establishment, and audible/electric awareness and warning alerts.

Before proceeding to the detailed description, the following definition relates to the subject protection device system 10. Inmarsat is a British satellite telecommunications company that provides global mobile services including telephone and data services through a network of geostationary telecommunications satellites. The use of Inmarsat herein is deemed to include other networks with similar capabilities.

The description which follows is of the embodiment of the subject protection and location system of this invention, which is suitable for exercising positive remote boundary control and subject location through cellular and/or satellite means from a remote location.

Figure 1:
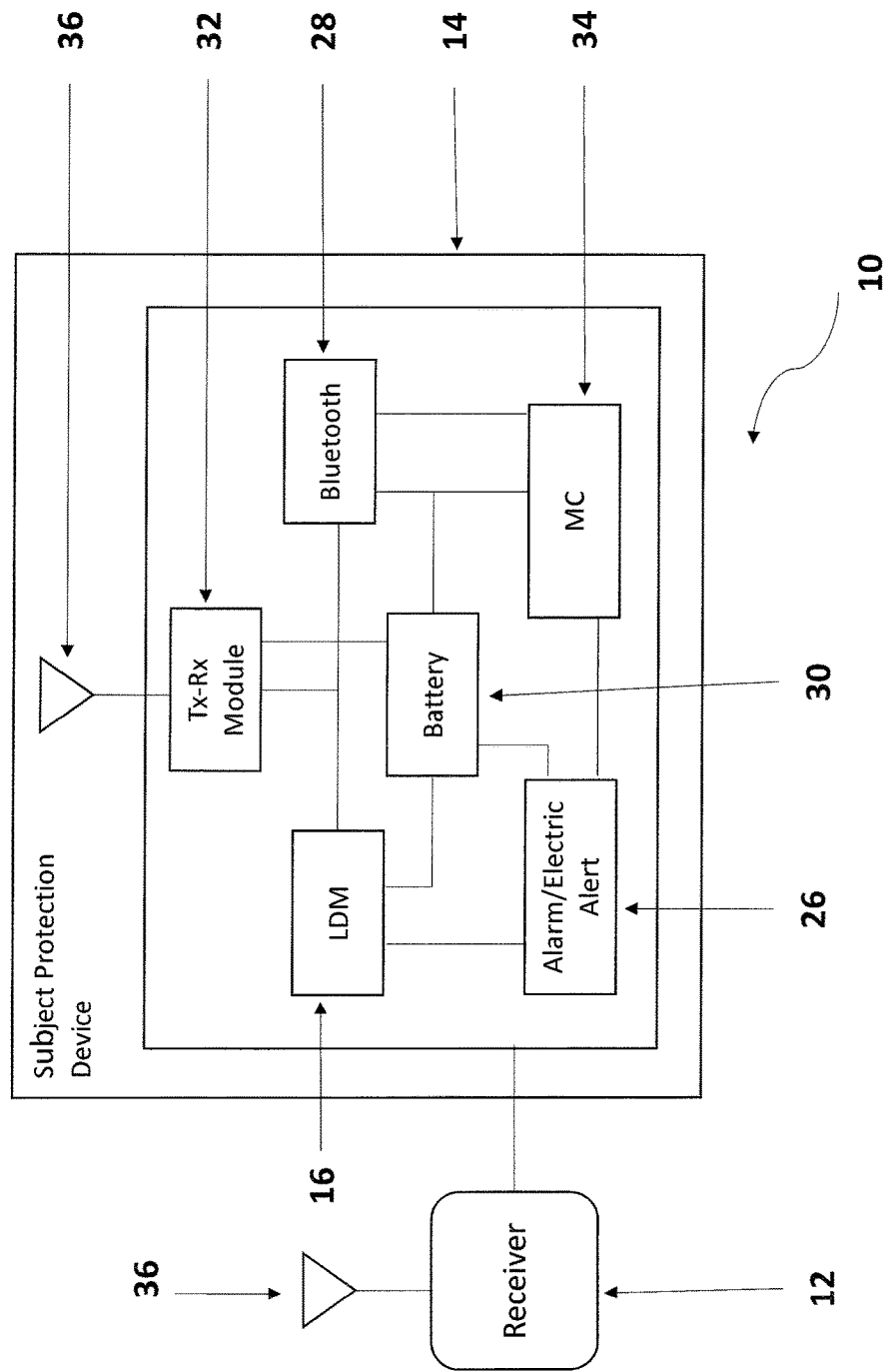
FIG. 1 is a component diagram of the system showing the relationship of the components and interface.

As set forth in FIG. 1, the invention is shown as interfacing a separate wearable/mountable device or subject protection device 14 having the ability to send and receive data through a Bluetooth or other wireless communication module 28 with a receiver 12 such as a smartphone or other device capable of interfacing with the subject protection device 14. The interface between the receiver 12 and the subject protection device 14 is capable of being remotely activated from any distance within range of a cellular or satellite signal.

The subject protection device 14 is affixed to the subject by a collar, imbedded in a piece of clothing/accessory or ankle bracelet or otherwise located within, on or near the subject and includes application code and an associated application capable of managing preset or user entered settings on the subject protection device 14. The subject protection device 14 and the receiver 12 are interconnected using Bluetooth or other wi-fi technologies. The receiver 12 is modifiable by the user to interact with a single subject protection device 14 or with numerous autonomous subject protections devices 14, individually or as a group.

The present invention provides for the user of the receiver 12 to determine the location of the subject protection device 14 within a span of as little as 6 feet. The ability to remotely locate a subject affixed with the subject protection device 14 within such a short distance is achieved through the use of cellular/satellite systems, which are uniquely utilized by this invention and novel to the industry.

In addition, the invention disclosed herein provides capabilities that create static and dynamic simple or complex geometric boundaries for the subject affixed to the subject protection device 14 from a remote location. Applications for this are widespread and the solution is not currently available. Pet owners can establish and alter boundaries at and away from home. Safe zones while traveling can be set and altered in accordance with outside variables such as rising tides or other dynamic hazards. People who require assistance when not directly supervised can be monitored and kept safe from external hazards. Detained subjects can be monitored and allowed controlled movement. Valuable assets can be monitored and location continually enforced.

Referring now to FIGS. 1 through 5, the embodiment of the protection and location system hereof is shown and generally referred to by the number 10. In this embodiment, the receiver 12 is interconnected to the subject protection device 14 through a cellular and/or satellite connection 36. The subject protection device 14 is in the form of a small electronic component that is contained in a wearable apparatus such as a collar or embedded in a piece of clothing, accessory or similar. In the case of animals, the subject protection device is designed to fit in a wearable apparatus or to be directly affixed with a tag or similar directly on the animal.

The subject protection device 14 includes six modules. The first module is the Location Determination Module (LDM) 16. The second module is the alarm/electric alert 26. The third module is the Bluetooth component 28. The fourth module is the battery 30. The fifth module is the Tx-Rx Module 32. The sixth module is the microprocessor controller (MC) 34.

Figure 2:
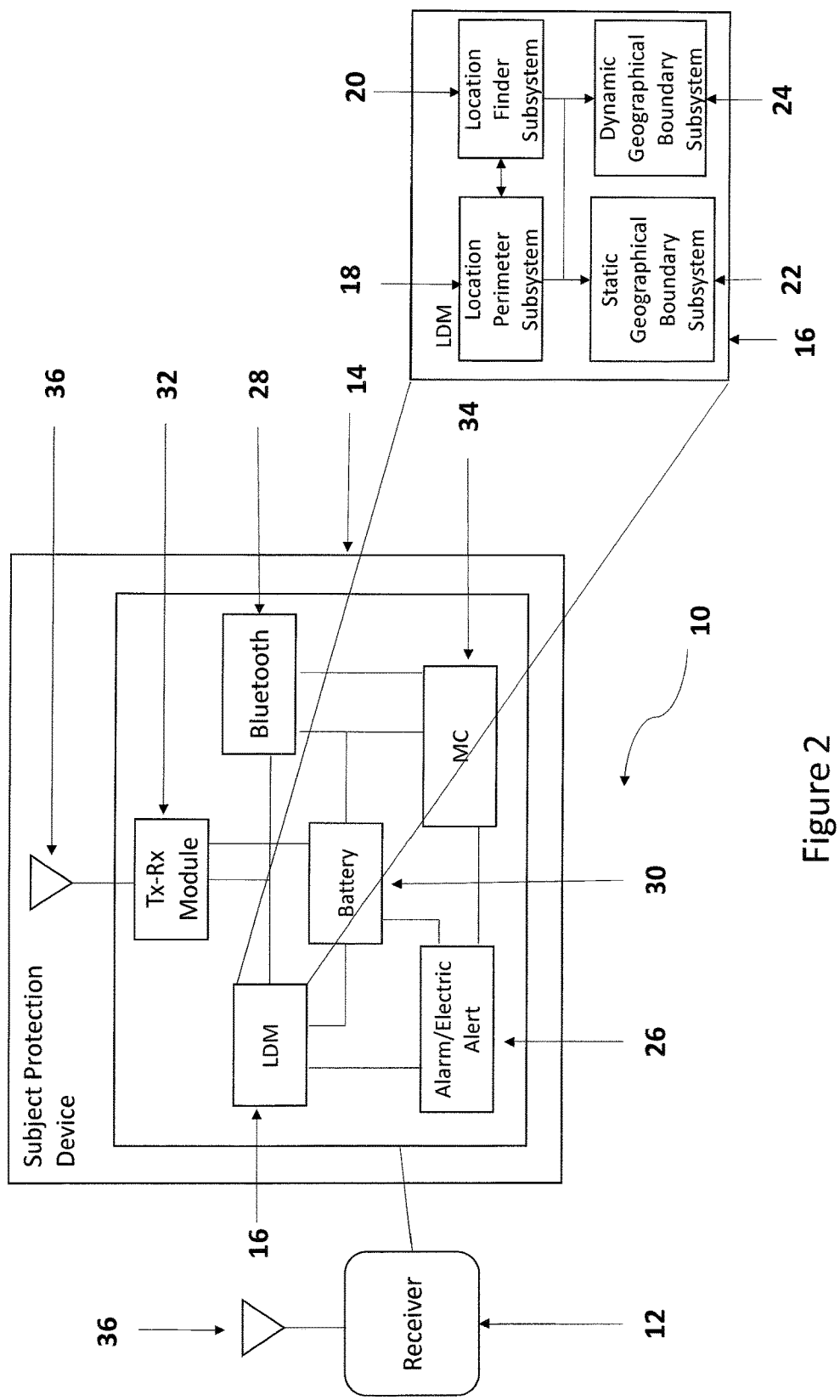
FIG. 2 is an expanded component and process diagram of FIG. 1 showing the location determination module subsystems.

The LDM 16 provides location tracking through four subsystems which are shown in FIG. 2: the location perimeter subsystem 18; the location finder subsystem 20; the static geographical boundary subsystem 22; and the dynamically adjustable geometric boundary subsystem 24. The LDM 16 interacts with the Bluetooth component 28, the battery 30, the Tx-Rx module 32 and the alarm/electric alert 26.

The location perimeter subsystem 18 provides receive and transmit signals to determine location of the subject. During the initialization, the location perimeter subsystem 18 circuit is in receive mode. This initial receive location data verifies and validates boundary and protection settings. Once the location is determined, the LDM 16 provides location tracking information and transmits periodic location updates to the receiver 12. The location perimeter subsystem 18 interacts with the location finder subsystem 20.

The location finder subsystem 20 locates the subject protection device 14 through an on-demand approach with user notifications either set initially by a user through the receiver 12 or at will as user modified through the receiver 12. The location finder subsystem 20 interacts with the location perimeter subsystem 18, the dynamic geographical boundary subsystem 24 and the static geographical boundary subsystem 22.

The static geographical boundary subsystem 22 establishes the geometric points that form parameters communicated to the alarm/electric alert module. The static geographical boundary subsystem 22 interacts with the location finder subsystem 20.

The dynamically adjustable geometric boundary subsystem 24 provides the geometric points to the subject protection device 14 and establishes parameters communicated to the alarm/electric alert module 26. The dynamically adjustable geometric boundary subsystem 24 interacts with the location finder subsystem 20.

The Bluetooth module 28 establishes the interface between the subject protection device 14 and the receiver 12 using cellular and/or satellite 36 stations. The Bluetooth module 28 transmits data including boundary settings, electric alert value, and positional data relative to the receiver 12. The Bluetooth module 28 interacts with the MC 34, the battery 30, the Tx-Rx module 32 and the LDM 16.

Figure 3:
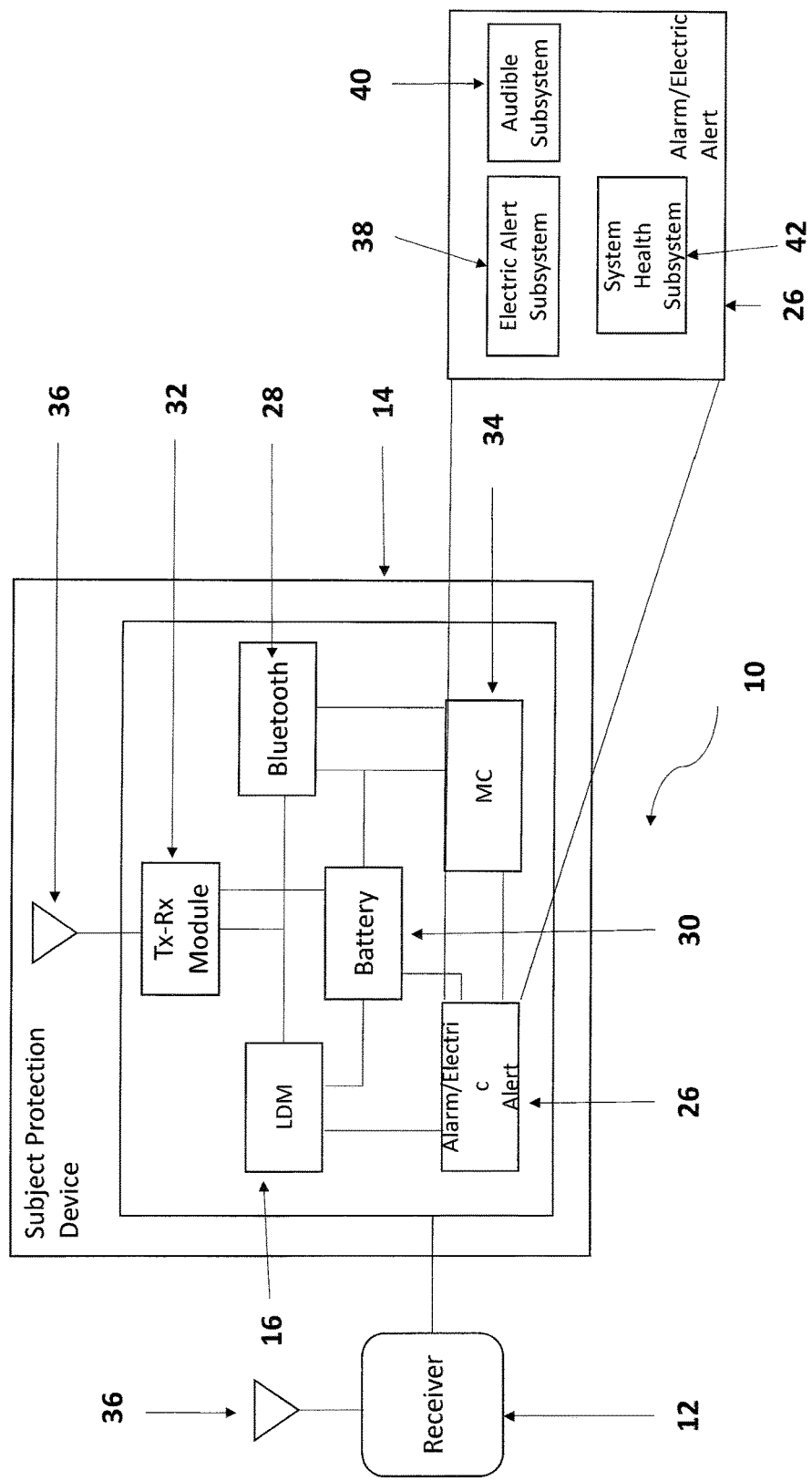
FIG. 3 is an expanded component and process diagram showing the alarm/electric alert module subsystems.

The alarm/electric alert module 26 includes three subsystems as shown in FIG. 3: the electric alert subsystem 38; the audible subsystem 40; and the system health subsystem 42. The alarm/electric alert module interacts with the LDM 16, the battery 30 and the MC 34 and is set and activated in accordance with instructions preset or actively modified by the receiver 12.

The alarm electric subsystem 38 controls the range of the current from 0.10 mA to 2.0 mA, inclusive, and allows for the establishment or removal of incremental settings. Activation of the alarm electric subsystem 38 triggers an electric alert activation to 14 and a notification to 12.

The audible subsystem 40 provides an audible alarm that is modifiable to occur independently and/or prior to the electric alert activation by the alarm electric subsystem 38 and triggers a notification to the receiver 12 and the subject protection device 14.

The system health subsystem 42 monitors the circuits to ensure proper safety and operations of the subsystems. The health monitoring is completed by having boundary components and flags built into each subsystem that is provided back to the user interface. Additionally, it provides the current status of all modules within the subject protection device 14.

The battery module 30 provides the required power to operate the subject protection device 14. The battery module 30 is selected from batteries that meet the following standards or any similar standards: the US UL 1642, Lithium Batteries for cells and UL 2054 for Battery packs; and the EU IEC 60086-4 for primary cells and batteries.

The Tx-Rx module or serial communication device 32 transmits and receives cellular and satellite signals to interface with the receiver 12. The Tx-Rx module accepts both GPS and cellular interfaces to provide position, time and output position to the other subsystems. The position data from the GPS provides accurate position data such location data can be provided for the user. Additionally, the Tx-Rx module output can be used to communicate with user. The Tx-Rx module 32 interfaces with the LDM 16, the battery 30 and the Bluetooth module 28.

The MC module or microprocessor controller 34 is a highly-integrated single-chip device that enables Bluetooth® Smart/Bluetooth® Low Energy (BLE) v4.1 and IEEE® 802.15.4-2011 RF connectivity for portable, extremely low-power embedded systems. Applications of the MC module 34 (KW40Z MCU) include portable health care devices, wearable sports and fitness devices, AV remote controls, computer keyboards and mice, gaming controllers, access control, security systems, smart energy and home area networks. The MC module 34 capabilities include, but are not limited to, integrating a 2.4 GHz transceiver supporting a range of FSK/GFSK and O-QPSK modulations, an ARM® Cortex®-M0+ CPU, 160 KB Flash and 20 KB SRAM, BLE Link Layer hardware, 802.15.4 packet processor, hardware security and peripherals optimized to meet the requirements of the target applications. The MC module 34 has on-chip memory to concurrently run both a Bluetooth Low Energy stack and an IEEE 802.15.4 MAC/PHY for multi-mode applications. The MC module 34 interfaces with the alarm/electric alert 26, the battery 30, and the Bluetooth module 28.

Figure 4:
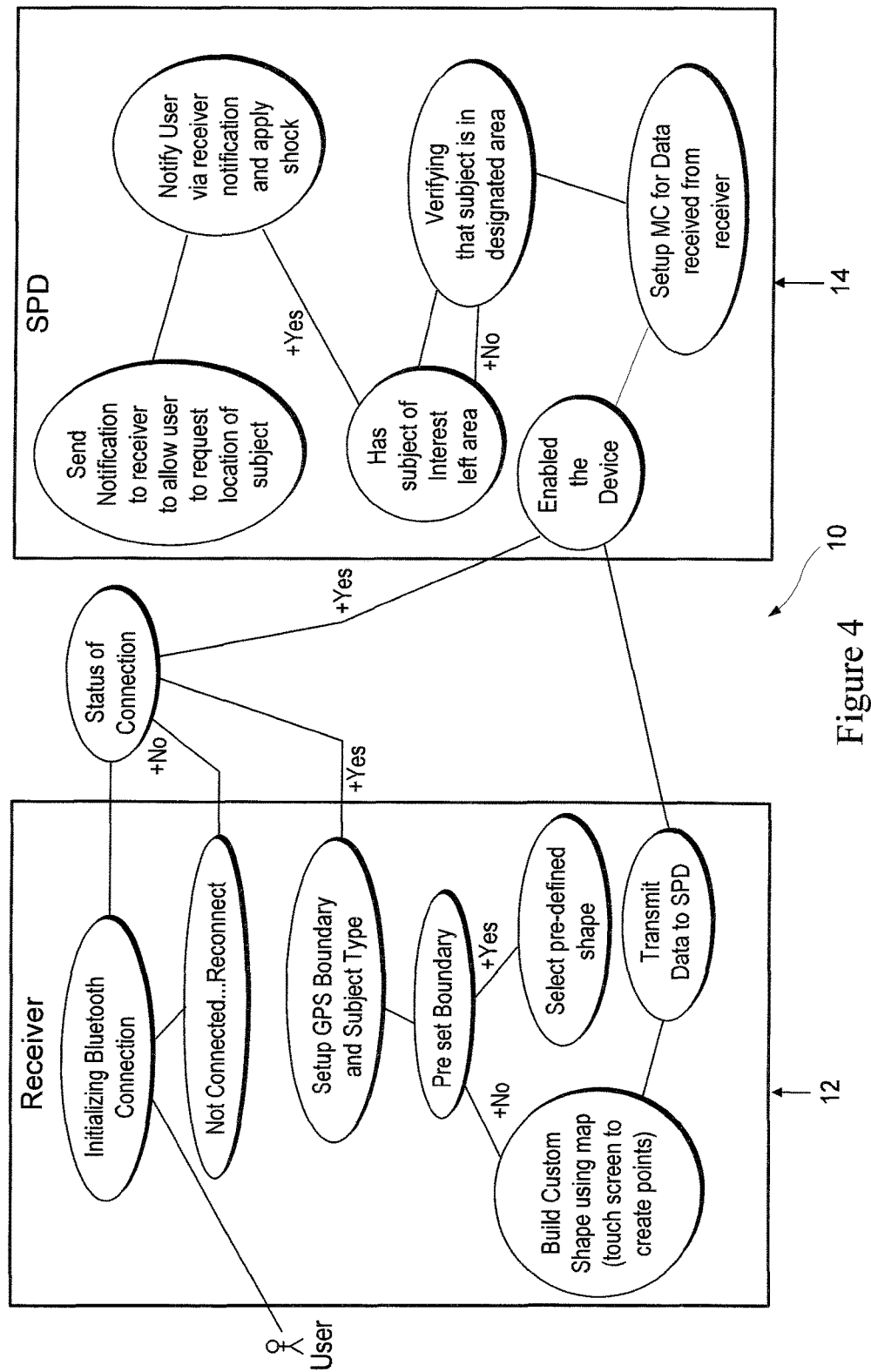
FIG. 4 is a process flow diagram showing the system process and notification flow.
Figure 5:
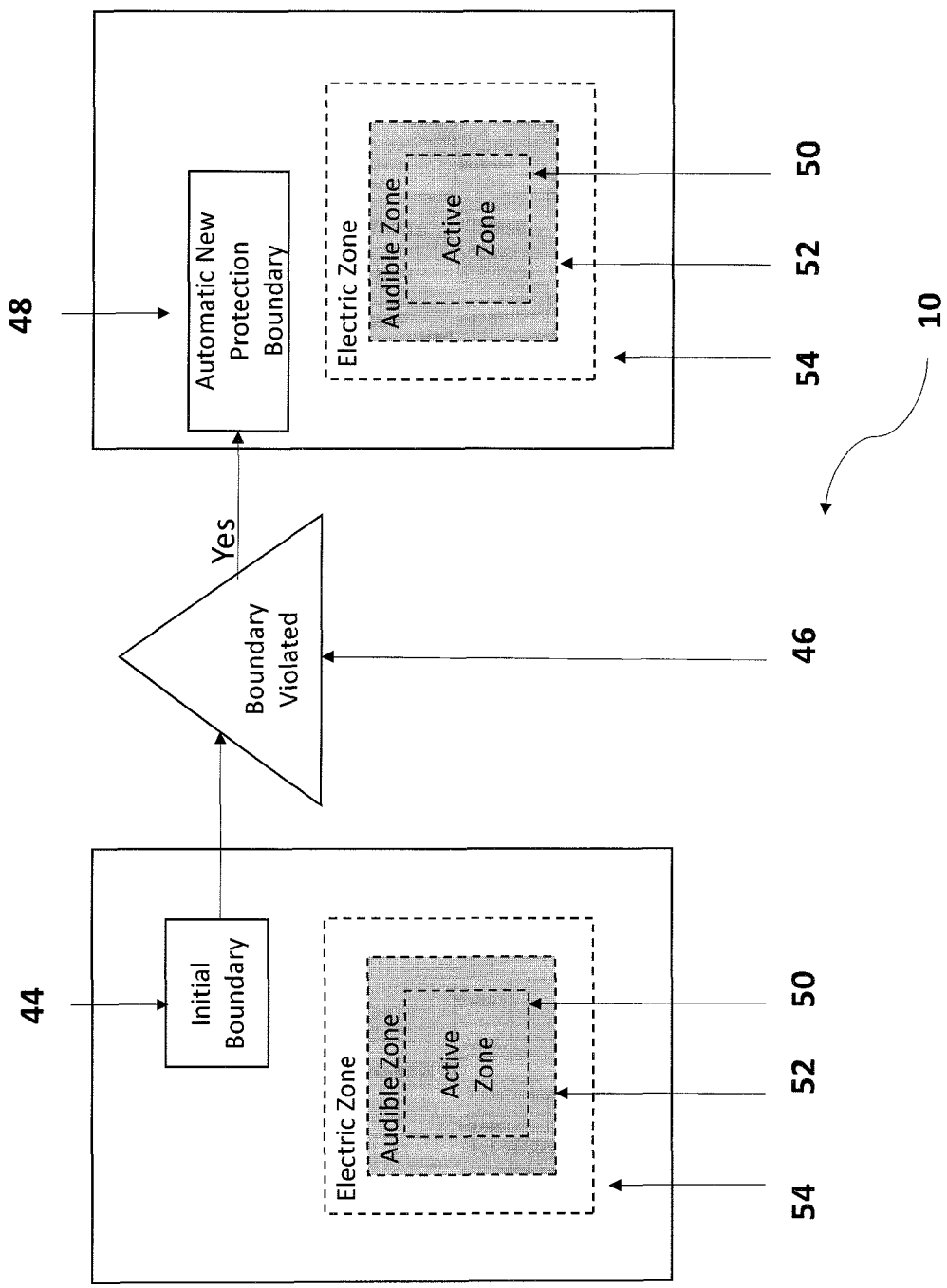
FIG. 5 is a process diagram showing the initialized dynamic automated boundary containment process for a boundary breach by a controlled subject.

FIGS. 4 and 5 set forth the flow of interaction between the receiver 12 and the subject protection device 14. The receiver 12 and the subject protection device 14 notification systems interface when boundary limits are neared and/or reached and provide data and warnings to both the receiver 12 and the subject protection device 14. The receiver 12 is notified through the display and/or audible/vibrational signal of system status. The receiver 12 is also user customizable to provide notifications relating to battery life, boundary, geolocation, and current status of the subject. The subject is provided by the subject protection device 14 with audible and/or electric reinforcement pulse notifications commencing when the subject protection device 14 is within a user preset distance from the geometric boundary limits 44 and escalating and removed in a manner selected by the user through the receiver 12 including after the boundary 46 is breached.

The method established by this invention provides the receiver 12 with the capability to remotely configure the subject protection device 14 from a distance only limited by the availability of a cellular and/or satellite signals. Once the application is activated (see FIG. 4) on the receiver 12, the receiver 12 provides parameters that that are transmitted to the subject protection device 14 and implemented and downloaded to the subject protection device 14 via Bluetooth and/or other cellular, satellite or wi-fi application.

The receiver 12 provides options for a user to elect to establish, alter, and reestablish boundaries by selecting pre-designed geometric shapes centered on the subject protection device 14 or within a desired area. In addition, the receiver 12 provides an interface with mapping capabilities utilizable to designate and set a boundary from a remote distance. This mapping tool provides an interface allowing for user selected pinpoints to be established manually, forming an appropriate geometric shape associated with the selected pinpoints thereby establishing the boundary transmitted to the subject protection device 14.

There are two main functions of this invention—establishing static and dynamic remote boundaries with positive reinforcement and geolocation. When combined in the method set forth herein, control over a subject is obtained through remote activation even in the event of a breach of a boundary.

In the event that the subject affixed to the subject protection device 14 exceeds the defined boundary limits 44 set by the receiver 12, an on-demand location request from the receiver 12 is sent to the subject protection device 14 and the subject protection device 14 responds with its present location. This function allows for removal of the positive reinforcement once the boundary is breached and removal of alarm and electric alerts, location of the subject, and the reestablishment of the boundary limits with positive reinforcement 48.

The present invention includes fail safes to automatically reset boundaries if the user does not respond to the subject protection device 14 notification of boundary exceedance signal. If a boundary 44 is exceeded, the MC 34 in conjunction with the LDM 16, without additional outside input, establishes a predetermined boundary 48 to contain the subject affixed to the subject protection device 14. This dynamic fail safe boundary 48 is established when boundaries are exceeded, reestablishing a predefined geometric boundary or active zone 50 with positive reinforcement bands including an audible warning zone 52 and an electric alert warning zone 54. These capabilities are essential to a wireless boundary system to protect the health and welfare of a subject while maintaining awareness of the user/caretaker. Once the initial boundary 44 is exceeded and a new protection boundary 48 is set, the receiver 12 and the subject protection device 14 reset the new protection boundary 48 to replace the initial boundary 44 allowing for a continuing loop of protection boundary resets in the event of a continuing boundary break by the subject.

This invention solves at least two distinct problems with the prior art. The first is ease of mobility for positive containment and the second is geolocation and control of the subject(s) if the boundary is exceeded. The use of fixed and dynamically configurable geometric boundaries providing mobile capability allows the user to take a subject to any location and maintain positive control of the subject within a defined boundary. Additionally, the use of receiver 12 ensures that if the boundary conditions are exceeded the user can find the subject by activating the location finder subsystem of the subject protection device 14 and reestablish the boundary system at another location through an easy to use interface or automatic preset.

FIG. 4 sets forth the details and method of the above-described invention wherein an enforceable dynamic boundary and location system is created by interfacing a subject protection device 14 having wireless connectivity with an external cellular or satellite device receiver 12.

The disclosed invention provides a unique integrated solution to transmit position when a subject affixed to the subject protection device 14 is not in close proximity to the receiver 12 and resolves the containment and relocation issues associated with the prior art. Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. An enforceable dynamic boundary system comprising:
a subject protection device configured to be affixed to a subject, the subject protection device having
a location determination module configured to emit a location tracking signal;
an alert module configured to provide an electric alert and an audible alert;
a wireless communication module configured to interface with cellular and satellite systems;
a battery providing power to the subject protection device;
a serial communication device having cellular and satellite receiving and transmitting capabilities; and
a microprocessor controller;
a receiver configured to wirelessly interconnect with the subject protection device from a remote location via the wireless communication module;
a first boundary established wirelessly and remotely by the receiver from a distance within range of a cellular or satellite signal for the protection of the subject; and
a second boundary, different from the first boundary, established wirelessly and remotely by the receiver from a distance within range of a cellular or satellite signal in response to a breach of the first boundary by the subject for the protection of the subject.

2. The enforceable dynamic boundary system of claim 1, wherein the receiver is configured to wirelessly transmit boundary coordinates selected from a group consisting of initial predetermined boundary coordinates, user entered boundary coordinates, predetermined boundary breach coordinates, and user entered boundary breach coordinates, to the subject protection device.

3. The enforceable dynamic boundary system of claim 2, wherein the subject protection device provides continuous and on demand subject location coordinates.

4. The enforceable dynamic boundary system of claim 3, wherein the receiver is configured to adjust boundary coordinates in the event of a boundary breach.

5. The enforceable dynamic boundary system of claim 4, wherein the receiver is configured to interface with one or more subject protection devices.

6. The enforceable dynamic boundary system of claim 5, wherein the location determination module further comprises:
a location perimeter subsystem configured to provide location and tracking;
a location finder subsystem configured to provide on demand location coordinates;
a static geographical boundary subsystem configured to form the boundary coordinates and communicate the boundary coordinates to the alert module; and,
a dynamically adjustable geometric boundary subsystem configured to form the boundary coordinates and communicate the boundary coordinates to the alert module.

7. The enforceable dynamic boundary system of claim 6, wherein the alert module further comprises:
an electric alert subsystem configured to provide a current in the range of 10 mA to 2.0 mA, inclusive, when the subject protection device interacts with the boundary coordinates;
an audible subsystem configured to provide an audible alarm when the subject protection device interacts with the boundary coordinates; and
a system health subsystem configured to monitor the electric alert subsystem and the audible subsystem.

8. The enforceable dynamic boundary system of claim 7, wherein the serial communication device is a Tx-Rx module.

9. The enforceable dynamic boundary system of claim 8, wherein the wireless communication module interface is Bluetooth enabled.

10. The enforceable dynamic boundary system of claim 9, wherein the receiver is configured to include data relating to the functional status of the subject protection device.

11. The enforceable dynamic boundary system of claim 10, wherein the subject protection device is affixed to a member of a group consisting of a person, a group of people, an animal, a group of animals, an asset and a group of assets.

12. The enforceable dynamic boundary system of claim 7, wherein the receiver is configured to wirelessly and remotely increase current level of the electric alert subsystem.

13. The enforceable dynamic boundary system of claim 1, wherein the receiver is configured to receive coordinates of the subject protection device and establish boundary coordinates based on the received coordinates of the subject protection device.

14. The enforceable dynamic boundary system of claim 13, wherein boundary coordinates can be stored on the subject protection device for future use.

15. A method of establishing an enforceable dynamic boundary system comprising:
    wirelessly interfacing a receiver with a subject protection device from a remote location, the subject protection device being configured to be affixed to a subject;
    determining, by the receiver, the subject protection device location from the remote location point;
    wirelessly and remotely establishing, by the receiver, a first boundary from a distance within range of a cellular or satellite signal for the protection of the subject;
    wirelessly and remotely establishing, by the receiver, a second boundary, different from the first boundary, from a distance within range of a cellular or satellite signal in response to a breach of the first boundary by the subject for the protection of the subject.

16. The method of establishing the enforceable boundary system of claim 15, wherein the subject protection device comprises:
    a location determination module configured to emit a location tracking signal;
    an alert module configured to provide an electric alert and an audible alert;
    a wireless communication module configured to interface with cellular and satellite systems;
    a battery providing power to the subject protection device;
    a serial communication device having cellular and satellite receiving and transmitting capabilities; and
    a microprocessor controller.

17. The method of establishing the enforceable boundary system of claim 16, wherein the receiver is configured to wirelessly transmit boundary coordinates selected from a group consisting of initial predetermined boundary coordinates, user entered boundary coordinates, predetermined boundary breach coordinates, and user entered boundary breach coordinates, to the subject protection device.

18. The method of establishing the enforceable dynamic boundary system of claim 15, wherein the subject protection device provides continuous and on demand subject location coordinates.

19. The method of establishing the enforceable dynamic boundary system of claim 18, wherein the receiver is configured to interface with one or more subject protection devices.

20. The method of establishing the enforceable dynamic boundary system of claim 19, wherein the wireless communication module interface is Bluetooth enabled.

21. The method of establishing the enforceable dynamic boundary system of claim 20, wherein the receiver is configured to include data relating to the status of the subject protection device.

22. The method of establishing the enforceable dynamic boundary system of claim 21, wherein the subject protection device is affixed to a member of a group consisting of a person, a group of people, an animal, a group of animals, an asset and a group of assets.

* * * * *